UNITED STATES PATENT OFFICE.

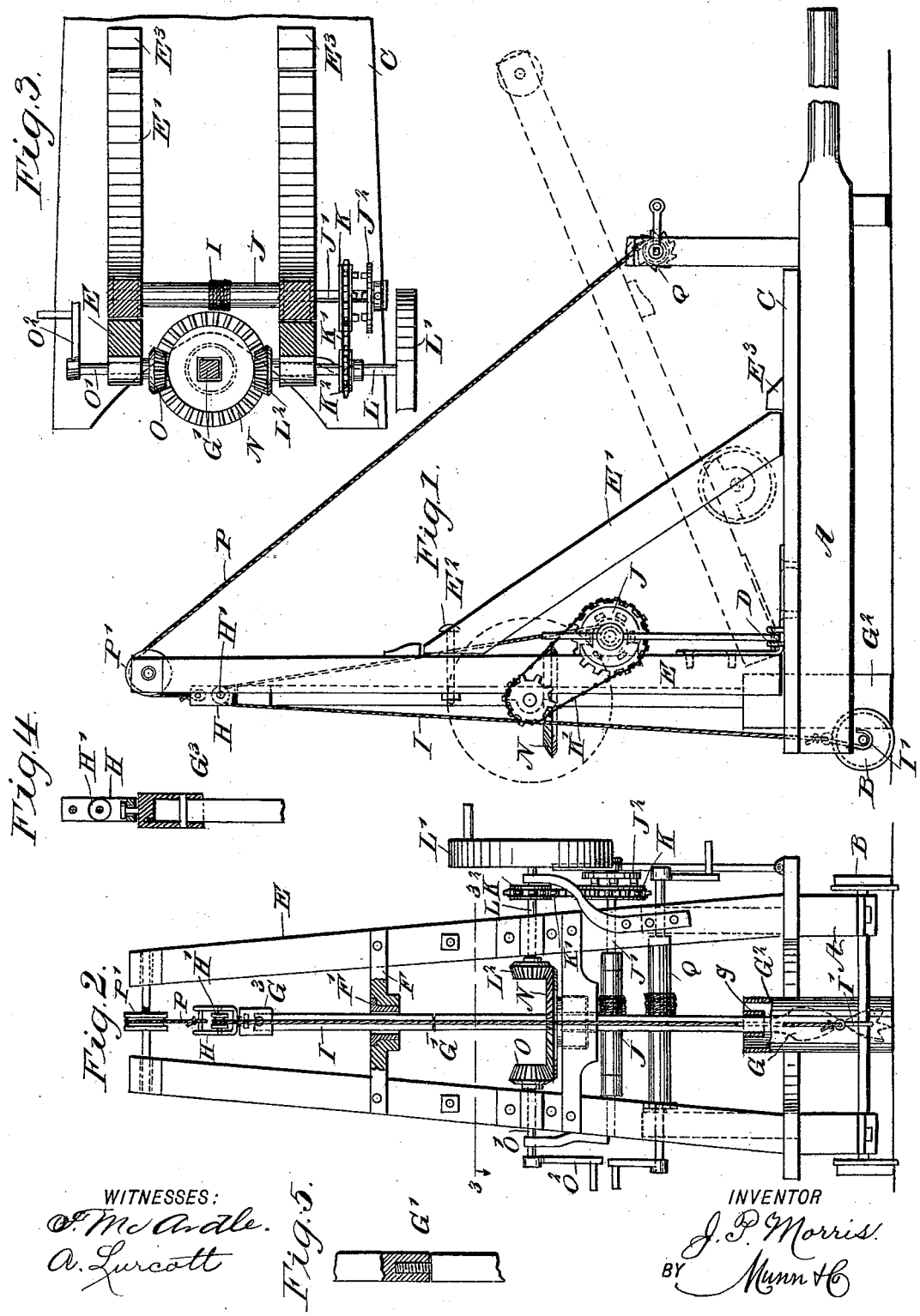

JOHN P. MORRIS, OF BURDETT, NORTH CAROLINA.

POST OR POLE HOLE MACHINE.

SPECIFICATION forming part of Letters Patent No. 515,245, dated February 20, 1894.

Application filed July 25, 1893. Serial No. 481,408. (No model.)

*To all whom it may concern:*

Be it known that I, JOHN P. MORRIS, of Burdett, in the county of Mecklenburg and State of North Carolina, have invented a new and Improved Post or Pole Hole Machine, of which the following is a full, clear, and exact description.

The object of the invention is to provide a new and improved machine, which is simple and durable in construction and more especially designed for conveniently and rapidly boring holes in the ground for setting up posts or poles used for various purposes.

The invention consists principally of an auger having its shaft mounted to slide in and be revolved by a gear wheel, a rope passing over a pulley held on the auger shaft, and connected at one end with a fixed support and at the other end with a windlass, to enable the operator to exert a pressure on the auger to force the latter into the ground at the time a revolving motion is given to the auger by the gear wheel.

The invention also consists of certain parts and details and combinations of the same, as will be hereinafter described and then pointed out in the claims.

Reference is to be had to the accompanying drawings forming a part of this specification, in which similar letters of reference indicate corresponding parts in all the figures.

Figure 1 is a side elevation of the improvement. Fig. 2 is an end elevation of the same, with part in section. Fig. 3 is a sectional plan view of the same on the line 3—3 of Fig. 2. Fig. 4 is a sectional side elevation of the upper end of the auger shaft; and Fig. 5 is a sectional side elevation showing the connection between two auger shaft sections.

The improved machine is provided with a suitably constructed hand truck A, having its forward end mounted on wheels B, and provided at its rear end with suitable handles for conveniently shifting the truck about on the ground. The truck A is provided with a platform C, carrying hinges D connected with the standards E adapted to be folded back upon the platform when transporting the machine from place to place. Normally, however, the standards E are vertically disposed and are securely held in place by braces E', connected at their upper ends, by bolts E², with the standards, the lower ends of the braces resting against lugs E³ attached to the platform C.

On the standards E is secured a cross bar F, containing a collar F' having a square aperture for the correspondingly shaped square shaft G' carrying the auger G. Upon the auger shaft G a cylinder G² is mounted to slide but to turn therewith by a keeper $g$ in the cylinder and through which the shaft passes. The cylinder is adapted to support the ground loosened by the auger, at the same time forming a temporary wall for the lining of the hole made by the auger.

The auger shaft G' is preferably made in sections, screwed together, as illustrated in Fig. 5, the sections varying in length according to the depth of the hole to be driven.

On the upper end of the auger shaft G' is secured a cap G³ in which is mounted to turn a pulley block H, carrying a pulley H' over which passes a rope I provided at one end with a hook I' adapted to be hooked upon a fixed support, preferably the axle for the wheel B, as illustrated in the drawings. The rear end of the rope I winds on the windlass J, of any approved construction, and having its shaft J' journaled in the standards E.

On the shaft J' is secured a clutch J² adapted to be engaged by a clutch sprocket wheel K held loosely on the said shaft and connected by a sprocket chain K' with a sprocket wheel K², attached to the driving shaft L journaled in one of the standards E. This driving shaft L is provided at its outer end with a crank wheel L' adapted to be turned by one of the operators, so as to rotate the shaft L and the shaft J' of the windlass J whenever the clutch J² engages the clutch on the sprocket wheel K.

On the inner end of the shaft L is secured a beveled gear wheel L² in mesh with a beveled gear wheel N, having a square central aperture through which passes loosely the correspondingly shaped shaft G' of the auger G. The gear wheel N is also engaged by a beveled gear wheel O arranged opposite the gear wheel L² and secured on a shaft O' journaled in suitable bearings on the other standard E, and provided with a crank arm O² under the control of the second operator. Thus, when the crank arm $O^2$ and the crank wheel L' are set in motion, the two shafts L and O' impart, by their gear wheels $L^2$ and O respectively, a rotary motion to the gear wheel N, so that a like motion is given to the auger shaft G' and consequently to the auger G and cylinder $G^2$.

In order to force the auger into the ground, the clutch $J^2$ is connected with the clutch on the sprocket wheel K, so that the windlass J is rotated at the same time, as previously explained, whereby the rope I is wound upon the windlass and, as the hook end is fastened on a fixed support, the said rope exerts a downward pressure on the upper end of the auger shaft G', so as to force the auger into the ground.

The pulley block H is connected at its upper end with a rope P passing over a pulley P' journaled in the upper ends of the standards E. The rope P then extends downward and rearward to wind on the drum of a windlass Q, of any approved construction, and journaled in suitable supports erected on the rear part of the truck A. Now, when the auger G has drilled a hole a suitable depth into the ground and filled the cylinder $G^2$ with the loosened ground, then the operator interrupts the movement given to the shafts L and O' and actuates the windlass Q so as to wind up the rope P, whereby the auger shaft G', the auger G and its cylinder $G^2$ are lifted out of the hole to permit the operator to empty the cylinder of the loosened ground. When this has been done the auger, as well as the cylinder, is put back into the previously formed hole and the above described operation is repeated; that is, a rotary motion is first given to the auger to drill another length into the ground, and when the cylinder is filled with the loosened ground, the windlass Q is set in motion to remove the auger and cylinder to empty the latter.

Having thus described my invention, I claim as new, and desire to secure by Letters Patent—

1. A device of the class described, comprising an auger mounted to slide in and be revolved by a gear wheel, a rope passing over a pulley on the auger shaft and connected at one end with a fixed support, and a windlass connected with the other end of the said rope to wind up the latter, so as to exert a downward pressure on the auger to force the latter into the ground at the time a revolving motion is given to the auger by the said gear wheel, substantially as shown and described.

2. In a post-hole machine, the combination with an auger-shaft and auger, a cylinder mounted and made slidable on the latter but turning therewith, means for rotating the auger and shaft, and a tension device attached to the auger-shaft, and means for taking up or adjusting said device for continuing downward pressure on the auger while rotating, substantially as shown and described.

3. In a machine of the class described, the combination, with a revoluble auger, of a pulley block journaled on the upper end of the auger shaft, a rope passing over the pulley in the said pulley block and adapted to be secured at one end to a fixed support, and a windlass for winding up the other end of the said rope at the time a revolving motion is given to the said auger, substantially as shown and described.

JOHN P. MORRIS.

Witnesses:
  C. B. CROSS,
  A. H. JOHNSTON.